US011963166B2

(12) United States Patent
Golitschek Edler von Elbwart

(10) Patent No.: US 11,963,166 B2
(45) Date of Patent: *Apr. 16, 2024

(54) TWO-STAGE TRIGGER PROCEDURE

(71) Applicant: Panasonic Intellectual Property Corporation of America, Torrance, CA (US)

(72) Inventor: Alexander Golitschek Edler von Elbwart, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,698

(22) Filed: Feb. 15, 2023

(65) Prior Publication Data

US 2023/0199762 A1    Jun. 22, 2023

Related U.S. Application Data

(63) Continuation of application No. 17/357,590, filed on Jun. 24, 2021, now Pat. No. 11,617,190, which is a
(Continued)

(30) Foreign Application Priority Data

Nov. 4, 2016    (EP) .................................. 16002352

(51) Int. Cl.
*H04W 72/1268* (2023.01)
*H04W 16/14* (2009.01)
(Continued)

(52) U.S. Cl.
CPC ....... *H04W 72/1268* (2013.01); *H04W 16/14* (2013.01); *H04W 72/0446* (2013.01);
(Continued)

(58) Field of Classification Search
CPC ............. H04W 72/1268; H04W 16/14; H04W 72/0446; H04W 72/1215; H04W 72/23; H04W 76/11
See application file for complete search history.

(56) References Cited

U.S. PATENT DOCUMENTS 11,019,676 B2    5/2021    Bergstrom et al.
11,026,107 B2    6/2021    You et al.
(Continued)

FOREIGN PATENT DOCUMENTS

CN    103548409 A    1/2014
WO    2015/127669 A1    9/2015

OTHER PUBLICATIONS

Nokia, Alcatel-Lucent Shanghai Bell, On Two-stage UL scheduling for eLAA, 3GPP TSG RAN WG1 Meeting # 86 Gothengurg, Sweden, Aug. 22-26, 2016, R1-167074 (Year: 2016).*
(Continued)

Primary Examiner — Vinncelas Louis
(74) Attorney, Agent, or Firm — Seed IP Law Group LLP

(57) ABSTRACT

The invention relates to a user equipment for being scheduled with uplink radio resources. The user equipment receives from a radio base station a first-stage uplink resource scheduling message, indicating uplink radio resources usable by the UE to perform an uplink transmission via an unlicensed cell. The receiver further receives a second-stage uplink resource scheduling message, which is related to the first-stage uplink resource scheduling message. Upon reception of the second-stage uplink resource scheduling message, a processor of the UE determines that an uplink transmission is scheduled in case the first-stage uplink resource scheduling message is valid. The first-stage uplink resource scheduling message is determined valid based on a determination as to whether an uplink transmission has been triggered by another second-stage uplink
(Continued)

resource scheduling message within a predetermined time period prior to reception of the second-stage uplink resource scheduling message. The UE then performs an uplink transmission.

20 Claims, 10 Drawing Sheets

Related U.S. Application Data continuation of application No. 16/346,359, filed as application No. PCT/EP2017/078082 on Nov. 2, 2017, now Pat. No. 11,083,000.

(51) Int. Cl.
*H04W 72/0446* (2023.01)
*H04W 72/12* (2023.01)
*H04W 72/23* (2023.01)
*H04W 76/11* (2018.01)

(52) U.S. Cl.
CPC ....... *H04W 72/1215* (2013.01); *H04W 72/23* (2023.01); *H04W 76/11* (2018.02)

(56) References Cited

U.S. PATENT DOCUMENTS

| | | |
|---|---|---|
| 2018/0092072 A1 | 3/2018 | Babaei et al. |
| 2021/0029682 A1 | 1/2021 | Babaei et al. |

OTHER PUBLICATIONS

3GPP TR 36.889 V13.0.0, "3rd Generation Partnership Project; Technical Specification Group Radio Access Network; Study on Licensed-Assisted Access to Unlicensed Spectrum; (Release 13)," Jun. 2015, 285 pages.
3GPP TS 36.211 V12.6.0, "3rd Generation Partnership Project; Technical Specification Group Radio Access Network; Evolved Universal Terrestrial Radio Access (E-UTRA); Physical channels and modulation (Release 12)," Jun. 2015, 136 pages.
3GPP TS 36.211 V8.9.0, "3rd Generation Partnership Project; Technical Specification Group Radio Access Network; Evolved Universal Terrestrial Radio Access (E-UTRA); Physical channels and modulation (Release 8)," Dec. 2009, 83 pages.
3GPP TS 36.212 V12.6.0, "3rd Generation Partnership Project; Technical Specification Group Radio Access Network; Evolved Universal Terrestrial Radio Access (E-UTRA); Multiplexing and channel coding (Release 12)," Sep. 2015, 95 pages.
3GPP TS 36.212 V14.0.0, "3rd Generation Partnership Project; Technical Specification Group Radio Access Network; Evolved Universal Terrestrial Radio Access (E-UTRA); Multiplexing and channel coding (Release 14)," Sep. 2016, 148 pages.
3GPP TS 36.213 V14.0.0, "3rd Generation Partnership Project; Technical Specification Group Radio Access Network; Evolved Universal Terrestrial Radio Access (E-UTRA); Physical layer procedures (Release 14)," Sep. 2016, 406 pages.
3GPP TS 36.321 V14.0.0, "3rd Generation Partnership Project; Technical Specification Group Radio Access Network; Evolved Universal Terrestrial Radio Access (E-UTRA); Medium Access Control (MAC) protocol specification (Release 14)," Sep. 2016, 96 pages.
Alcatel-Lucent et al., "Regulatory Requirements for Unlicensed Spectrum," R1-144348 (R1-144226), 3GPP TSG RAN WG1 Meeting #78bis, Agenda Item: 7.3.2.1, Ljubljana, Slovenia, Oct. 6-10, 2014, 26 pages.
Classon, Brian, "[86-04-212] eLAA 212," Email message to Klaus Hugl, Wang Yi, Sorour Falahati, and Srinivas Yerramalli, Sep. 6-12, 2016. (5 pages).
Ericsson, "Work Item on Enhanced LAA for LTE," RP-161581, Agenda Item: 10.4.1, 3GPP TSG RAN meeting #73, New Orleans, USA, Sep. 19-22, 2016. (12 pages).
ETSI EN 301 893 V1.8.1, "Broadband Radio Access Networks (BRAN); 5 GHz high performance RLAN; Harmonized EN covering the essential requirements of article 3.2 of the R&TTE Directive," Mar. 2015, 93 pages.
Huawei et al., "Two-stage scheduling for eLAA," R1-166137, 3GPP TSG RAN WG1 Meeting #86, Agenda Item: 7.2.1.1, Gothenburg, Sweden, Aug. 22-26, 2016, 7 pages.
Huawei, HiSilicon, "Impact on HARQ and DRX of Two-stage scheduling," R2-166460, Agenda Item: 8.1.2, 3GPP TSG-RAN WG2 Meeting #95bis, Kaohsiung, Oct. 10-14, 2016. (5 pages).
Huawei, HiSilicon, "On UL data transfer for Two-stage scheduling," R2-166443, Agenda item: 8.1.2, 3GPP TSG-RAN WG2 Meeting #95bis, Kaohsiung, Oct. 10-14, 2016, 4 pages.
Indian Office Action, dated Jan. 7, 2022, for Indian Application No. 201947016888 (7 pages).
International Search Report dated Feb. 16, 2018, for corresponding International Application No. PCT/EP2017/078082, 2 pages.
Korean Notice of Preliminary Rejection, dated Feb. 24, 2022, for Korean Application No. 10-2019-7012837, 12 pages. (with English translation).
LG Electronics et al., "WF on PUSCH multi-subframe scheduling in LAA," R1-163565, Agenda Item: 7.3.1.1, 3GPP TSG RAN WG1 #84bis, Busan, Korea, Apr. 11-15, 2016. (3 pages).
Nokia et al., "On Two-Stage UL scheduling tor eLAA," R1-164942, 3GPP TSG RAN WG1 Meeting #85, Agenda Item: 6.2.1.1, Nanjing, China, May 23-27, 2016, 10 pages.
Nokia, Alcatel-Lucent Shanghai Bell, "On Two-Stage UL scheduling for eLAA," R1-167074, Agenda Item: 7.2.1.1, 3GPP TSG RAN WG1 Meeting #86, Gothenburg, Sweden, Aug. 22-26, 2016, 7 pages.
Panasonic, "CR on validation for triggered grants in eLAA," R1-1612294, 3GPP TSG-RAN WG1 Meeting #87, Reno, U.S.A., Nov. 14-18, 2016. (2 pages).
Panasonic, "Maximum Usability of Two-Stage Grants," R1-1612291, Agenda Item: 6.1.7, 3GPP TSG-RAN WG1 Meeting 87, Reno, U.S.A., Nov. 14-18, 2016. (2 pages).
Panasonic, "Virtual CRC for Two-Stage Rants," R1-1612293, Agenda Item: 6.1.7, 3GPP TSG-RAN WG1 Meeting 87, Reno, U.S.A., Nov. 14-18, 2016. (3 pages).
Panasonic, Qualcomm Incorporated, "CR on trigger monitoring timeline for triggered grants in eLAA," R1-1613509, 3GPP TSG-RAN WG1 Meeting #87, Reno, U.S.A., Nov. 14-18, 2016. (3 pages).
Qualcomm Incorporated, "DCI design for PUSCH scheduling in eLAA," R1-164410, Agenda Item: 6.1.7, 3GPP TSG RAN WG1 #85, Nanjing, China, May 23-27, 2016. (4 pages).
Qualcomm, [Nokia, ASB], Huawei, Hisilicon, Intel, ZTE, "Way Forward on supporting trigger based transmission for UL in eLAA," R1-165923, 3GPP TSG RAN WG1 Meeting #85, Busan, Korea, May 23- 27, 2016, 6 pages.
Samsung, "Discussion on two-step UL grant scheduling," R1-166691, 3GPP TSG RAN WG1 Meeting #86, Agenda Item: 7.2.1.3, Gothenburg, Sweden, Aug. 22-26, 2016, 4 pages.
Sesia et al., "LTE The UMTS Long Term Evolution—From Theory to Practice," WILEY, 2011, Chapter 9.3, 24 pages.
Taiwanese Search Report dated Feb. 2, 2021, for the corresponding Taiwanese Patent Application No. 106134556, 2 pages. (With English Translation).
English Translation of Chinese Office Action, dated Nov. 11, 2022, for Chinese Patent application No. 201780066684.7. (9 pages).

* cited by examiner

TWO-STAGE TRIGGER PROCEDURE

BACKGROUND

Technical Field

The present disclosure relates to a user equipment for being scheduled with uplink radio resources and to a method for operating the user equipment.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade.

The work item (WI) specification on Long-Term Evolution (LTE) called Evolved UMTS Terrestrial Radio Access (UTRA) and evolved UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{SC}^{RB}$ subcarriers and $N_{symb}^{DL}$ symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}$ and $N_{RB}^{max,DL}=110$ are respectively the smallest and the largest downlink bandwidths, supported by the current version of the specification. $N_{SC}^{RB}$ is the number of subcarriers within one resource block. For normal cyclic prefix subframe structure, $N_{SC}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 12.6.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair". The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP).

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands. All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n☐300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmission(s) need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC).

Maximum five serving cells, including the PCell, can be configured at the moment for one UE.

The configuration and reconfiguration, as well as addition and removal, of component carriers can be performed by RRC. Activation and deactivation is done, e.g., via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink. When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Uplink/Downlink Scheduling

A MAC function in the eNodeB refers to scheduling, by which the eNB distributes the available radio resources in one cell among the UEs and among the radio bearers for each UE. In principle, the eNodeB allocates the downlink and uplink resources to each UE based on respectively the downlink data buffered in the eNodeB and based on buffer status reports (BSRs) received from the UE. In this process, the eNodeB considers the QoS requirements of each configured radio bearer and selects the size of the MAC PDU.

The usual mode of scheduling is dynamic scheduling, by means of downlink grant/assignment messages (DCIs) for the allocation of downlink transmission resources and uplink grant/assignment messages for the allocation of uplink transmission resources. They are transmitted on the physical downlink control channel (PDCCH) using a cell radio network temporary identifier (C-RNTI) to identify the intended UE. In addition to the dynamic scheduling, persistent scheduling is defined, which enables radio resources to be semi-statically configured and allocated to a UE for a longer time period than one subframe, thus avoiding the need for specific downlink assignment messages or uplink grant messages over the PDCCH for each subframe. For the configuration or reconfiguration of a persistent schedule, RRC signaling indicates the resource allocation interval at which the radio resources are periodically assigned. When the PDCCH is used to configure or reconfigure a persistent schedule, it is necessary to distinguish the scheduling messages which apply to a persistent schedule from those used for dynamic scheduling. For this purpose, a special scheduling identity is used, known as the semi-persistent scheduling C-RNTI, SPS-C-RNTI, which for each UE is different from the C-RNTI used for dynamic scheduling messages.

In order to inform the scheduled users about their allocation status, transport format and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

Downlink control information occurs in several formats that differ in overall size and also in the information contained in their fields. The different DCI formats that are currently defined for LTE are described in detail in 3GPP TS 36.212, "Multiplexing and channel coding", section 5.3.3.1 (current version v12.6.0 available at http://www.3gpp.org and incorporated herein by reference). For detailed information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference. Additional formats may be defined in the future.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, 3GPP Release 11 introduced an EPDCCH that fulfills basically the same function as the PDCCH, i.e., conveys L1/L2 control signaling, even though the detailed transmission methods are different from the PDCCH. Further details can be found in the current versions of 3GPP TS 36.211 and 36.213, incorporated herein by reference. Consequently, most items outlined in the background and the embodiments apply to PDCCH as well as EPDCCH, or other means of conveying L1/L2 control signals, unless specifically noted.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g., Resource Blocks, RBs) on which a user is allocated. Alternatively this information is termed resource block assignment (RBA). Note, that the number of RBs on which a user is allocated can be dynamic;

Carrier indicator, which is used if a control channel transmitted on a first carrier assigns resources that concern a second carrier, i.e., resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. In the following, some DCI formats are listed as currently defined for LTE. More detailed information is provided in the 3GPP technical standard TS 36.212 v14.0.0, particularly in section 5.3.3.1 "DCI formats", incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

Format 5: DCI format 5 is used for the scheduling of the PSCCH (Physical Sidelink Control Channel), and also contains several SCI format 0 fields used for the scheduling of the PSSCH (Physical Sidelink Shared Control Channel). If the number of information bits in DCI format 5 mapped onto a given search space is less than the payload size of format 0 for scheduling the same serving cell, zeros shall be appended to format 5 until the payload size equals that of format 0 including any padding bits appended to format 0.

LTE on Unlicensed Bands—Licensed-Assisted Access (LAA)

In September 2014, 3GPP initiated a new study item on LTE operation on unlicensed spectrum. The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. One advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum such as Wi-Fi. LTE operation on unlicensed bands will therefore at least in the beginning be considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum, i.e., without being assisted by licensed cells, however shall not be excluded. Enhanced Licensed Assisted Access (eLAA) is enhancement to LAA, particularly exploiting the unlicensed spectrum in the uplink as well. Efficient use of unlicensed spectrum as a complement to licensed spectrum has the potential to bring great value to service providers, and, ultimately, to the wireless industry as a whole. To leverage the full benefits of LTE operation in unlicensed spectrum, it is of outmost importance to define a complete UL access scheme in addition to the already defined DL access scheme.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

A very basic scenario is illustrated in FIG. 4, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

At present, the basic approach envisioned at 3GPP is that the PCell will be operated on a licensed band while one or more SCells will be operated on unlicensed bands. One benefit of this strategy is that the PCell can be used for reliable transmission of control messages and user data with high quality of service (QoS) demands, such as for example voice and video, while an SCell on unlicensed spectrum might yield, depending on the scenario, to some extent significant QoS reduction due to inevitable coexistence with other RATs.

It has been agreed that the LAA will focus on unlicensed bands at 5 GHz. One of the most critical issues is therefore the coexistence with Wi-Fi (IEEE 802.11) systems operating at these unlicensed bands. In order to support fair coexistence between LTE and other technologies such as Wi-Fi as well as to guarantee fairness between different LTE operators in the same unlicensed band, the channel access of LTE for unlicensed bands has to abide by certain sets of regulatory rules which may partly depend on the geographical region and particular frequency band; a comprehensive description of the regulatory requirements for all regions for operation on unlicensed bands at 5 GHz is given in R1-144348, "Regulatory Requirements for Unlicensed Spectrum", Alcatel-Lucent et al., RAN1#78bis, September 2014 incorporated herein by reference as well as the 3GPP Technical Report 36.889, current version 13.0.0. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of 3GPP is to target a single global framework for LAA which basically means that all requirements for different regions and bands at 5 GHz have to be taken into account for the system design.

For example, in Europe certain limits for the Nominal Channel Bandwidth is set, as apparent from section 4.3 of the European standard ETSI EN 301 893, current version 1.8.1, incorporated herein by reference. The Nominal Channel Bandwidth is the widest band of frequencies, inclusive of guard bands, assigned to a single channel. The Occupied Channel Bandwidth is the bandwidth containing 99% of the power of the signal. A device is permitted to operate in one or more adjacent or non-adjacent channels simultaneously.

The listen-before-talk (LBT) procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations at the moment mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

In unlicensed spectrum, channel availability cannot always be guaranteed. In addition, certain regions such as Europe and Japan prohibit continuous transmissions and impose limits on the maximum duration of a transmission burst in the unlicensed spectrum. Hence, discontinuous transmission with limited maximum transmission duration is a required functionality for LAA. DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, associated with the master, to implement radar detection.

The operation on unlicensed bands at 5-GHz is in most regions limited to rather low transmit power levels compared to the operation on licensed bands which results in small coverage areas. Even if the licensed and unlicensed carriers were to be transmitted with identical power, usually the unlicensed carrier in the 5 GHz band would be expected to support a smaller coverage area than a licensed cell in the 2 GHz band due to increased path loss and shadowing effects for the signal. A further requirement for certain regions and bands is the use of TPC in order to reduce the average level of interference caused for other devices operating on the same unlicensed band.

Detailed information can be found in the harmonized European standard ETSI EN 301 893, current version 1.8.1, incorporated herein by reference.

Following this European regulation regarding LBT, devices have to perform a clear channel Assessment (CCA) before occupying the radio channel with a data transmission. It is only allowed to initiate a transmission on the unlicensed channel after detecting the channel as free based, e.g., on energy detection. In particular, the equipment has to observe the channel for a certain minimum time (e.g., for Europe 20 µs, see ETSI 301 893, under clause 4.8.3) during the CCA. The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is determined as being occupied, it shall not transmit on that channel during the next Fixed Frame Period. If the channel is classified as free, the equipment is allowed to transmit immediately. The maximum transmit duration is restricted in order to facilitate fair resource sharing with other devices operating on the same band.

The energy detection for the CCA is performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

In addition to the CCA described above, it might be required to apply an additional extended CCA (ECCA) if the equipment is classified as Load Based Equipment (LBE) according to the description in ETSI 301 893, clause 4.9.2.2, incorporated herein by reference. The ECCA comprises an additional CCA observation time for the duration of a random factor N multiplied by a CCA observation time slot. N defines the number of clear idle slots resulting in a total idle period that has to be observed before initiating a transmission.

Furthermore, the total time during which an equipment has transmissions on a given carrier without re-evaluating the availability of that carrier (i.e., LBT/CCA) is defined as the Channel Occupancy Time (see ETSI 301 893, under clause 4.8.3.1). The Channel Occupancy Time shall be in the range of 1 ms to 10 ms, where the maximum Channel Occupancy Time could be, e.g., 4 ms as currently defined for Europe. Furthermore, there is a minimum Idle time the UE is not allowed to transmit after a transmission on the unlicensed cell, the minimum Idle time being at least 5% of the Channel Occupancy Time. Towards the end of the Idle Period, the UE can perform a new CCA, and so on. This transmission behavior is schematically illustrated in FIG. 5, the figure being taken from ETSI EN 301 893 (there FIG. 2: "Example of timing for Frame Based Equipment").

FIG. 6 illustrates the timing between a Wi-Fi transmission and LAA UE transmissions on a particular frequency band (unlicensed cell). As can be seen from FIG. 5, after the Wi-Fi burst, a CCA gap is at least necessary before the eNB "reserves" the unlicensed cell by, e.g., transmitting a reservation signal until the next subframe boundary. Then, the actual LAA DL burst is started. This would similarly apply to an LTE UE which after successfully performing the CCA, would reserve the subframe by transmitting the reservation signal so as to then start the actual LAA UL burst.

Uplink Scheduling in Unlicensed Cells

DCI Formats 0A, 0B, 4A, and 4B are provided for eLAA so as to support uplink transmissions (PUSCH) for single subframe and multiple subframe grants and respectively single and multiple antenna ports.

DCI Format 0A: Single subframe, single antenna port
DCI Format 0B: Multiple subframe, single antenna port
DCI Format 4A: Single subframe, multiple antenna ports
DCI Format 4B: Multiple subframe, multiple antenna ports Details on these DCI format can be found in 3GPP technical standard TS 36.212 v14.0.0, sections 5.3.3.1.1A, 5.3.3.1.1B, 5.3.3.1.8A, 5.3.3.1.8B, incorporated herein by reference.

Any of these DCI formats (i.e., Uplink grants) can be either a single-stage grant or be part of a two-stage grant. In the current exemplary implementations in LTE (see TS 36.212), this is reflected by the "PUSCH trigger A"-field, which is a 1-bit field differentiating whether the received Uplink grant is for "a non-triggered scheduling", when the bit value is 0 (i.e., single-stage uplink grant) or is for "triggered scheduling", when the bit value is 1 (i.e., two-stage uplink grant). This can be controlled by the eNB, which is the responsible radio network entity for the scheduling of radio resources to the UE.

The two-stage uplink scheduling procedure requires two separate messages ("Trigger A" and "Trigger B") to be received in a specific manner by the UE so as to schedule one uplink transmission.

The trigger-A-message can be any of the above-noted uplink grants (i.e., DCI Formats 0A, 0B, 4A, or 4B). In connection with this two-stage grant, the four DCI Formats include the following data fields, as presently defined in the technical standard TS 36.212 v14.0.0:

"PUSCH trigger A—1 bit, where value 0 indicates non-triggered scheduling and value 1 indicates triggered scheduling as defined in section 8.0 of [3].

Timing offset—4 bits as defined in [3].
  When the flag for triggered scheduling is set to 0,
    The field indicates the absolute timing offset for the PUSCH transmission.
  Otherwise,
    The first two bits of the field indicate the relative timing offset for the PUSCH transmission.
    The last two bits of the field indicate the time window within which the scheduling of PUSCH via triggered scheduling is valid."

In addition, the available DCI Formats for the trigger-A message also include the usual data fields for indicating the radio resources that are scheduled for an uplink transmission, such as the "Resource block assignment" field, the "modulation and coding scheme" field, "HARQ process number" field, etc. Moreover, the DCI formats 0A, 0B, 4A, 4B (particularly the DCI CRC) can be scrambled with a UE specific identity (such as the C-RNTI), such that the corresponding uplink grants are addressed to a specific UE.

The trigger-B-message has the DCI Format 1C as currently defined in TS 36.212 v14.0.0, section 5.3.3.1.4, incorporated herein by reference. The DCI Format 1C, as currently defined in the technical standard for use within the scope of unlicensed carrier transmissions, including a two-stage grant procedure, is as follows:

"Else
   Subframe configuration for LAA—4 bits as defined in section 13A of [3].
   Uplink transmission duration and offset indication—5 bits as defined in section 13A of [3]. The field only applies to a UE configured with uplink transmission on a LAA SCell
   PUSCH trigger B—1 bit as defined in section 8.0 of [3]. The field only applies to a UE configured with uplink transmission on a LAA SCell
   Reserved information bits are added until the size is equal to that of format 1C used for very compact scheduling of one PDSCH codeword"

The trigger B message (DCI Format 1C), when being used as described above as part of the two-stage grant procedure, is usually not addressed to a specific UE but rather a shared identity (in this case the CC-RNTI; Common Control RNTI, which is an RNTI to be used in the context of providing common control PDCCH information; see 3GPP TS 36.321 v14.0.0, incorporated herein by reference) can be used by the eNB to scramble the DCI Format 1C, particularly the CRC thereof.

The cross-reference "[3]" in the above citations of TS 36.212 refers to the technical standard 3GPP TS 36.213, current version 14.0.0, of which at least sections 8.0 and 13 are relevant to the two-stage grants and are thus incorporated herein by reference in their entirety.

Particularly, section 8 of TS 36.213 defines in great detail for an LAA SCell when and how an uplink transmission (i.e., PUSCH) is to be performed:

"For a serving cell that is a LAA SCell, a UE shall
   upon detection of an PDCCH/EPDCCH with DCI format 0A/0B/4A/4B and with 'PUSCH trigger A' field set to '0' in subframe n intended for the UE, or
   upon detection of PDCCH/EPDCCH with DCI format 0A/0B/4A/4B and with 'PUSCH trigger A' field set to '1' in the most recent subframe from subframe n-v intended for the UE, and upon detection of PDCCH with DCI CRC scrambled by CC-RNTI and with 'PUSCH trigger B' field set to '1' in subframe n
   perform a corresponding PUSCH transmission, conditioned on the channel access procedures described in clause 15.2.1, in subframe(s) n+1+k+i with i=0, 1, . . . , N−1 according to the PDCCH/EPDCCH and HARQ process ID $\mod(n_{HARQ\_ID}+i, N_{HARQ})$, where N=1 for DCI format 0A/4A, and value of N is determined by the 'number of scheduled subframes' field in the corresponding DCI format 0B/4B.
      The UE is configured the maximum value of N by higher layer parameter maxNumberOfSchedSubframes-Format0B for DCI format 0B and higher layer parameter maxNumberOfSchedSubframes-Format4B for DCI format 4B;
   value of k is determined by the scheduling delay field in the corresponding DCI 0A/0B/4A/4B according to Table 8.2d if 'PUSCH trigger A' field set to '0' or Table 8.2e otherwise;
   value of $n_{HARQ\_ID}$ is determined by the HARQ process number field in the corresponding DCI format 0A/0B/4A/4B and $N_{HARQ}$=16;
   for 'PUSCH trigger A' field set to '0' in the corresponding DCI format 0A/0B/4A/4B,
      l=4
      otherwise value of 1 is the UL offset as determined by the 'UL configuration for LAA' field in the corresponding DCI with CRC scrambled by CC-RNTI according to the procedure in subclause 13A, and 'PUSCH trigger B' field set to '1',
   value of v is determined by the validation duration field in the corresponding PDCCH/EPDCCH with DCI format 0A/0B/4A/4B according to Table 8.2f, and 'PUSCH trigger A' field set to '1'
   the smallest value of 1+k supported by the UE is included in the UE-EUTRA-Capability TABLE 8.2d

| k for DCI format 0A/0B/4A/4B with 'PUSCH trigger A' field set to '0'. | |
| --- | --- |
| Value of 'scheduling delay' field | k |
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

TABLE 8.2e

| k for DCI format 0A/0B/4A/4B with 'PUSCH trigger A' field set to '1'. | |
| --- | --- |
| Value of 'scheduling delay' field | k |
| 00 | 0 |
| 01 | 1 |
| 10 | 2 |
| 11 | 3 |

TABLE 8.2f

| v for DCI format 0A/0B/4A/4B with 'PUSCH trigger A' field set to '1'. | |
| --- | --- |
| Value of 'validation duration' field | v |
| 00 | 8 |
| 01 | 12 |
| 10 | 16 |
| 11 | 20 |

The current 3GPP technical standards thus define in great detail how a two-stage grant procedure is to be performed. It should be however noted that the above provided definition of two-stage grant procedures as currently standardized is subject to a continuous change and improvement and thus may change in the future. Consequently, the above cited implementation of the two-stage grant procedure according to the current 3GPP technical standards is to be merely considered as an implementation example, where many details are of less importance to the present disclosure.

Nevertheless, for the present disclosure it is assumed that the basic concept behind the two-stage grant procedure will remain the same as discussed above. In particular, the basic concept will be explained in connection with FIG. 7, which illustrates the functioning of a two-stage grant including the transmission and reception of DCIs including trigger A and trigger B messages. For the following exemplary discussion it is assumed that the illustrated subframes are numbered by taking the subframe at which the trigger B (i.e., the second stage uplink scheduling message) is received in the UE, as reference subframe n; the preceding and subsequent subframes are numbered accordingly. It is further assumed that the trigger A message is received at subframe n−3, and that a time window of length v is defined within which the two-stage grant procedure can be validly performed. Put differently, the time window can be seen as defining the time period during which a trigger B message can be received so as to actually trigger a corresponding uplink transmission, based on the transmission parameters indicated by the trigger A and/or trigger B messages.

The time window length v can exemplarily be indicated within the trigger A message, as exemplified above by the last 2 bits of the timing offset field of the DCI Formats 0A, 0B, 4A, 4B in TS 36.212 and Table 8.2.f of TS 36.213.

When the trigger B message is received at subframe n, the UE will determine whether a related trigger A message was received by the UE within the time window of length v (starting immediately before the reception of the trigger B message, i.e., ranging from n−1 to n-v). In the illustrated scenario, the trigger A scheduling message was received in subframe n−3 and thus within the time window, thereby triggering the uplink transmission in the UE. The uplink transmission (i.e., PUSCH) is then performed with a particular transmission timing offset at subframe n+offset. The UE may perform the uplink transmission according to the information received in the trigger A message and trigger B message, e.g., using the indicated radio resources and modulation and coding scheme, etc.

The exact PUSCH timing offset is of less importance to the present disclosure. Exemplarily, as currently standardized in TS 36.213, the PUSCH timing offset is "1+k+i", where the parameter 1 is defined by the trigger B message (see "Uplink transmission duration and offset indication" field of DCI Format 1C in TS 36.212 and Table 13A-2 of TS 36.213), where the parameter k is defined by the trigger a message (see the first 2 bits of the "Timing offset" field of any of the DCI Formats 0A, 0B, 4A, and 4B in TS 36.212, as well as Table 8.2e in TS 36.213). Parameter i is applicable in case that multiple uplink subframes are scheduled by a two-stage uplink scheduling procedure, and in that case is running from 0 to the number of granted subframes minus 1 (otherwise it is just 0). More details can be derived from the above cited section 8 of TS 36.213. However, the PUSCH timing offset for performing the uplink transmission according to this two-stage uplink scheduling procedure may also be defined differently or may be even predetermined.

As mentioned above, 3GPP has defined a two-stage scheduling procedure for uplink transmissions in unlicensed cells. This two-stage scheduling procedure however can be further improved.

SUMMARY OF THE INVENTION

Non-limiting and exemplary embodiments provide improved methods and user equipments involved in scheduling uplink transmissions to be performed by the user equipments.

The independent claims provide non-limiting and exemplary embodiments. Advantageous embodiments are subject to the dependent claims.

According to one general aspect, a user equipment is described for being scheduled with uplink radio resources. At least one cell is configured for communication between the user equipment and a radio base station that is responsible for scheduling uplink radio resources on the cell. The user equipment comprises a receiver that receives from the radio base station a first-stage uplink resource scheduling message, indicating uplink radio resources usable by the user equipment to perform an uplink transmission via the scheduled cell. The receiver further receives from the radio base station a second-stage uplink resource scheduling message, which is related to the first-stage uplink resource scheduling message. The user equipment further comprises a processor that determines whether the first-stage uplink resource scheduling message is valid or not. The processor determines, when receiving the second-stage uplink resource scheduling message, that an uplink transmission is scheduled in case the processor has determined that the first-stage uplink resource scheduling message is valid. Thereby, the determination if the first-stage uplink resource scheduling message is valid is based on a determination as to whether an uplink transmission has been triggered by another second-stage uplink resource scheduling message within a predetermined time period prior to reception of the second-stage uplink resource scheduling message. The user equipment further comprises a transmitter that, in case the processor has determined that an uplink transmission is scheduled, performs an uplink transmission via the scheduled cell. The cell can, for example, be an unlicensed cell in the context of 3GPP LTE Release 14, or another cell where two-stage scheduling is supported.

Correspondingly, in another general aspect, the techniques disclosed here feature a method for operating a user equipment for being scheduled with uplink radio resources. At least one unlicensed cell is configured for communication between the user equipment and a radio base station that is responsible for scheduling uplink radio resources on the unlicensed cell. The method comprises receiving from the radio base station a first-stage uplink resource scheduling message, indicating uplink radio resources usable by the user equipment to perform an uplink transmission via the unlicensed cell. The method further comprises receiving from the radio base station a second-stage uplink resource scheduling message, which is related to the first-stage uplink resource scheduling message. The method further comprises determining whether the first-stage uplink resource scheduling message is valid or not. The method further comprises determining, when receiving the second-stage uplink resource scheduling message, that an uplink transmission is scheduled in case it has been determined that the first-stage uplink resource scheduling message is valid. Thereby, the determination if the first-stage uplink resource scheduling message is valid is based on a determination as to whether an uplink transmission has been triggered by another second-stage uplink resource scheduling message within a predetermined time period prior to reception of the second-stage uplink resource scheduling message. The method further comprises performing an uplink transmission via the unlicensed cell, in case it has been determined that an uplink transmission is scheduled.

Additional benefits and advantages of the disclosed embodiments will be apparent from the specification and figures. The benefits and/or advantages may be individually provided by the various embodiments and features of the specification and drawings disclose, and need not all be provided in order to obtain one or more of the same.

These general and specific aspects may be implemented using a user equipment and a method, and a combination of user equipment and method.

BRIEF DESCRIPTION OF THE FIGURES

In the following exemplary embodiments are described in more detail with reference to the attached figures and drawings.

DETAILED DESCRIPTION

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "unlicensed cell" or alternatively "unlicensed carrier" as used in the set of claims and in the application is to be understood broadly as a cell/carrier operated in an unlicensed frequency band, with a particular frequency bandwidth. Correspondingly, the term "licensed cell" or alternatively "licensed carrier" as used in the set of claims and in the application is to be understood broadly as a cell/carrier operated in a licensed frequency band, with a particular frequency bandwidth. Exemplarily, these terms are to be understood in the context of 3GPP as of Release 12/13 and the Licensed-Assisted Access Work Item.

Figure 1:
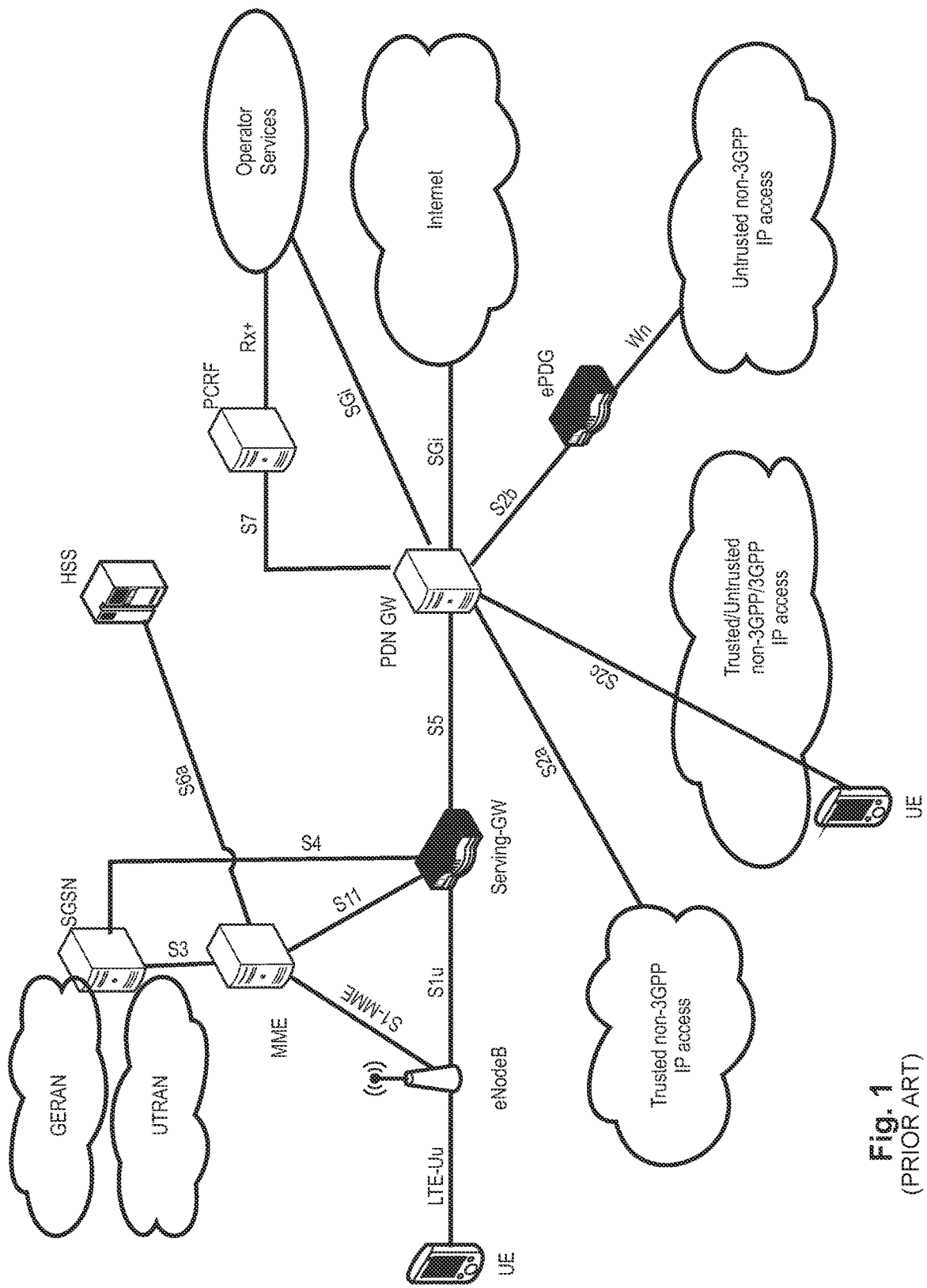
FIG. 1 shows an exemplary architecture of a 3GPP LTE system.
Figure 2:
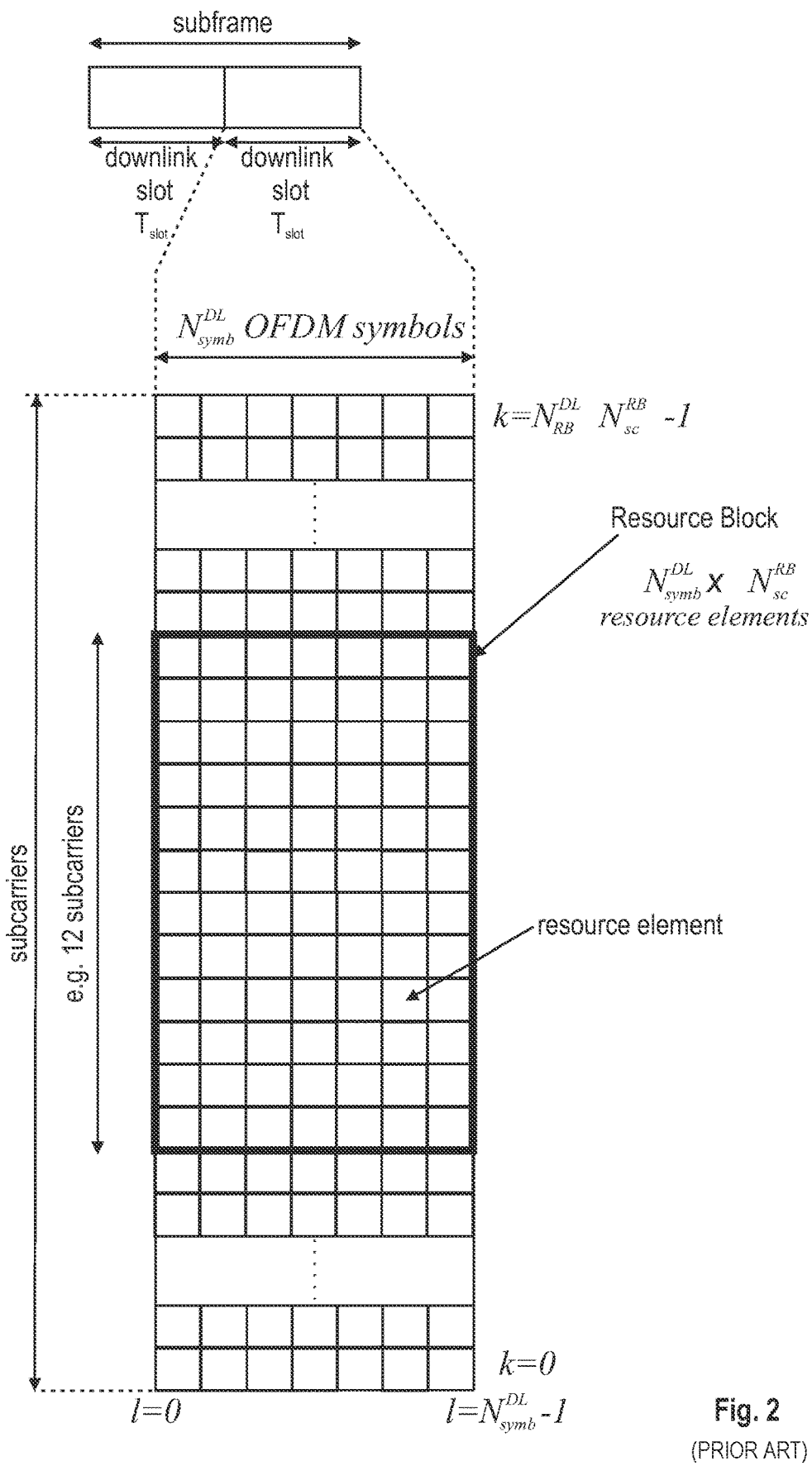
FIG. 2 shows an exemplary downlink resource grid of a downlink slot of a subframe as defined for 3GPP LTE (Release 8/9)
Figure 3:
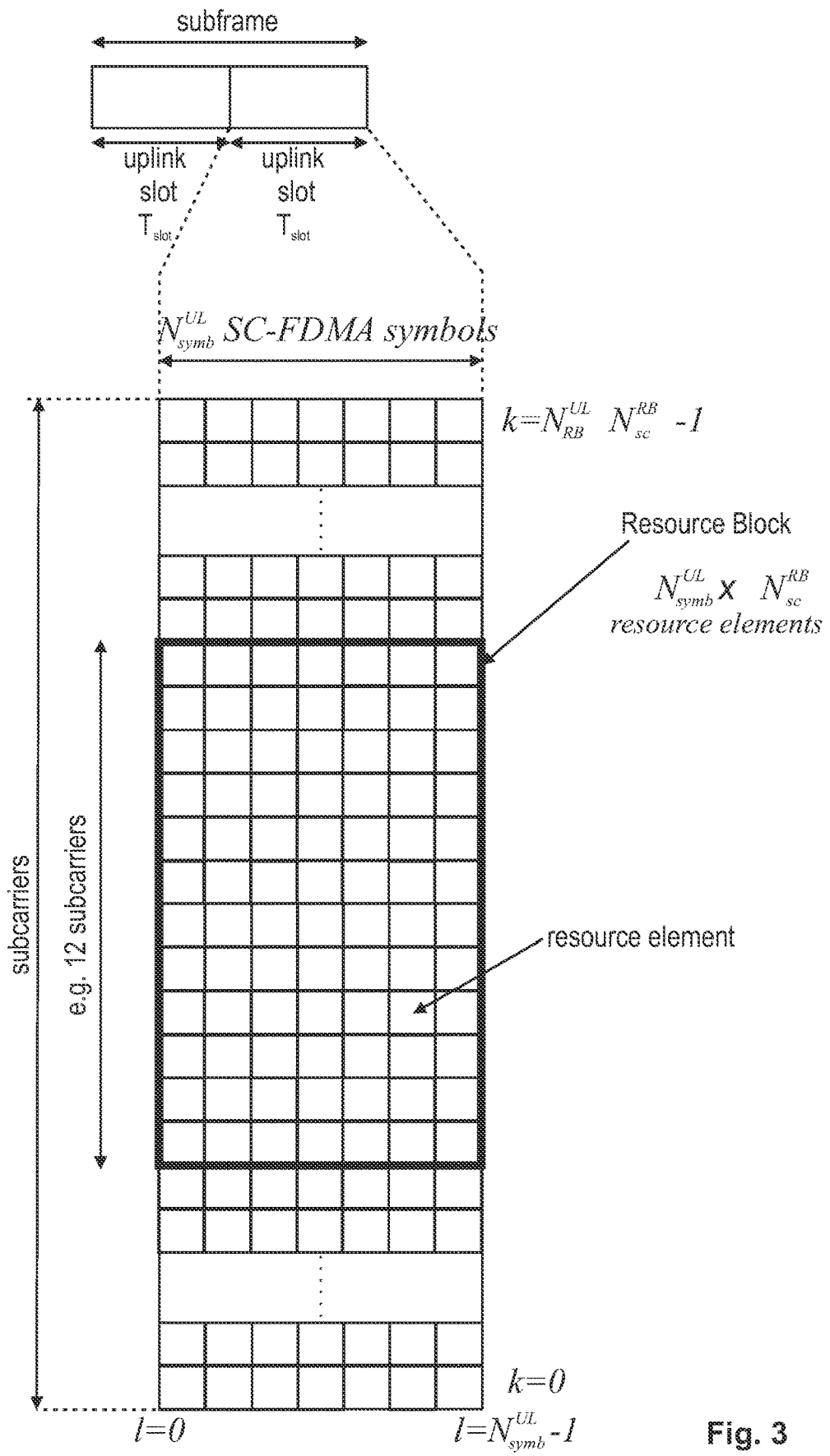
FIG. 3 shows an exemplary uplink resource grid of an uplink slot of a subframe as defined for 3GPP LTE.
Figure 4:
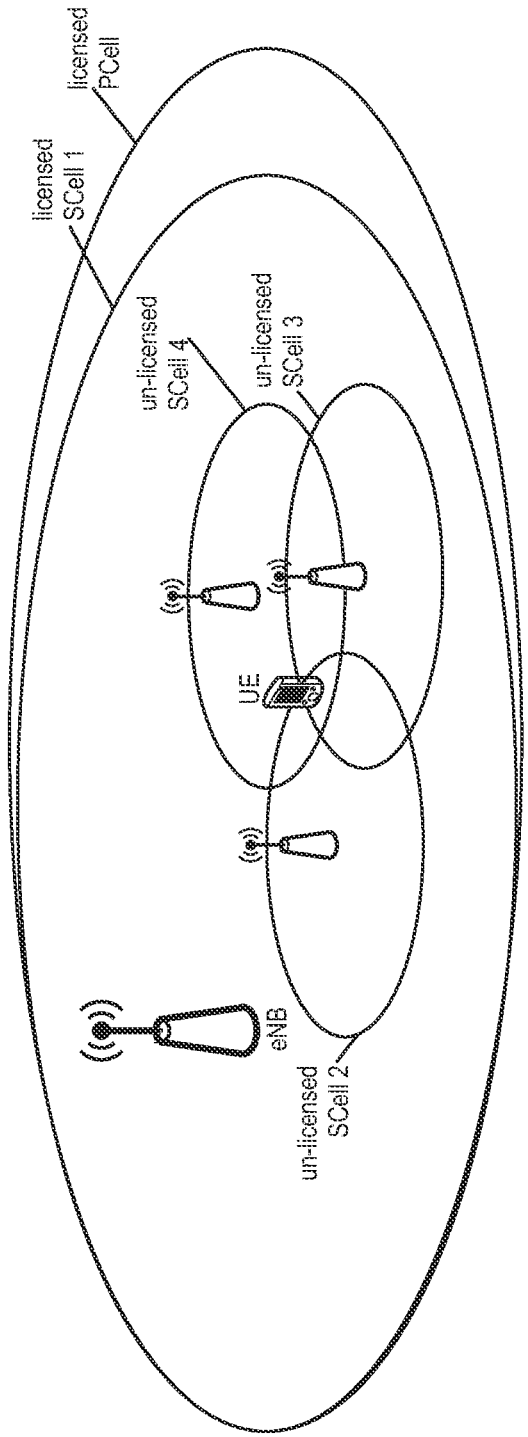
FIG. 4 illustrates an exemplary LAA scenario with several licensed and unlicensed cells.
Figure 5:
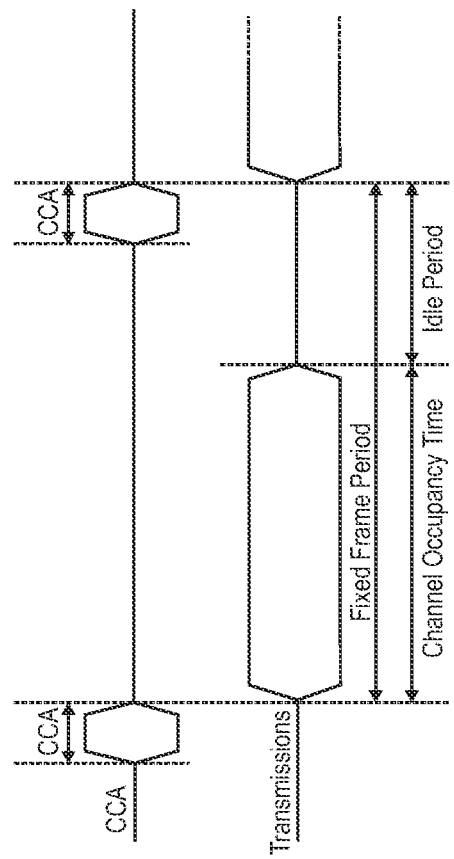
FIG. 5 illustrates the transmission behavior for an LAA transmission.
Figure 6:
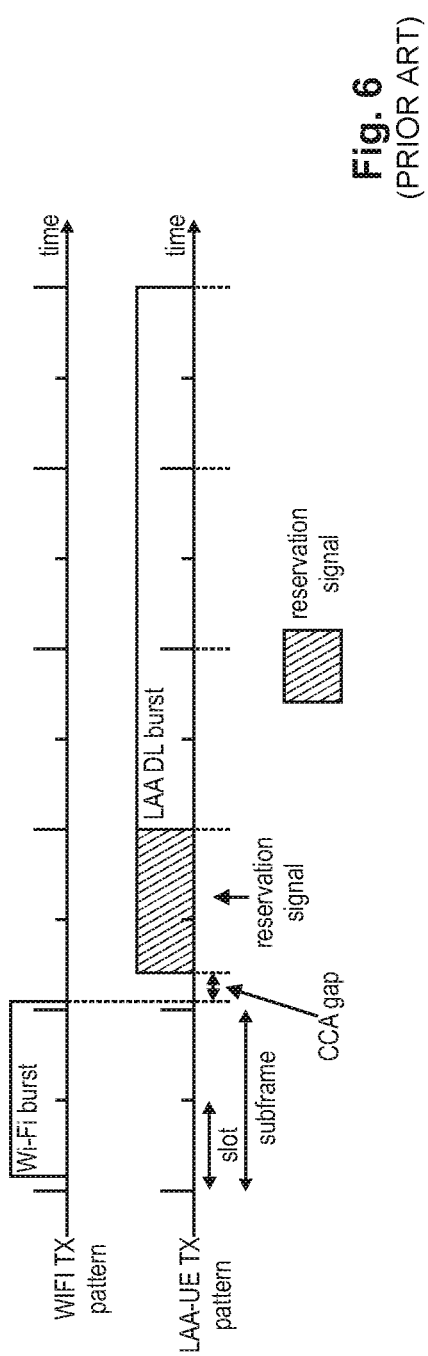
FIG. 6 illustrates the timing between a Wi-Fi transmission and LAA UE downlink burst for an unlicensed cell, FIG. 7 exemplarily illustrates the two-stage uplink scheduling procedure as provided for uplink transmissions via unlicensed cells.
Figure 7:
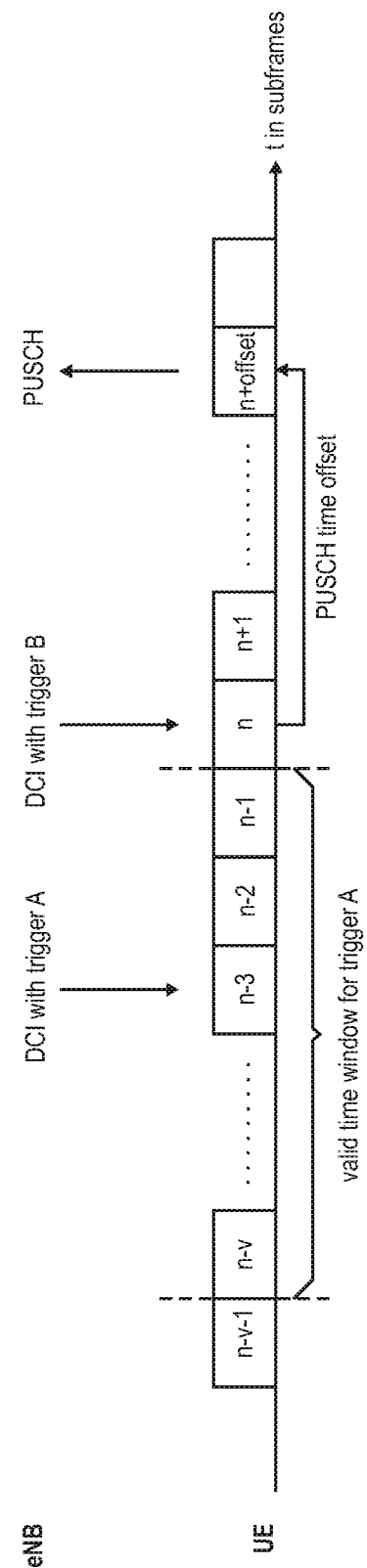
Figure 8:
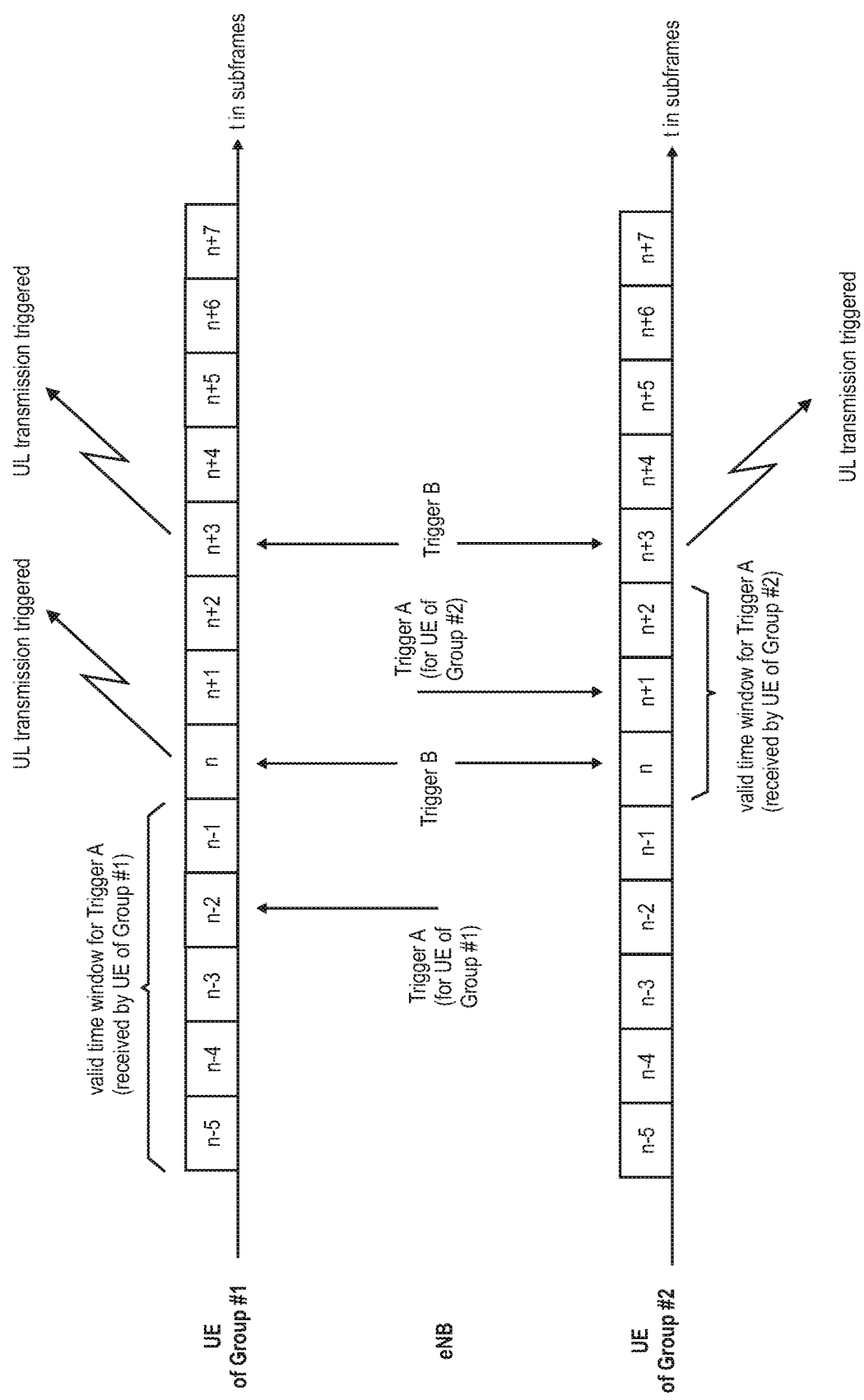
FIG. 8 illustrates multiple triggering of uplink transmissions in a multi-UE environment.

FIG. 8 illustrates a UE that belongs to UE group #1, a UE that belongs to UE group #2, as well as an eNodeB.

It is assumed that a Trigger A, which is the first-stage uplink resource scheduling message, is transmitted from the eNodeB to the UE of group #1 at subframe n 2. In this exemplary case, the valid time window for Trigger A as sent to UE of group #1 is 5 subframes. Thereby, the information about the valid time window is provided by Trigger A itself.

It is further assumed that a Trigger B, which is the second-stage uplink resource scheduling message, is transmitted from the eNodeB at subframe n. Trigger B is received by both UEs of groups #1 and #2, although the eNodeB has transmitted Trigger B with the intention that same is the second-stage uplink resource scheduling message for the already transmitted Trigger A (as the first-stage uplink resource scheduling message) to UE of group #1 at subframe n−2. In this exemplary case, it is assumed that no UE of group #2 has received any Trigger A within the corresponding valid time window before Trigger B. Upon reception of Trigger B, all UEs that are able to receive the Trigger B—which generally includes UEs from group #1 as well as from group #2—need to check whether they had received a Trigger A within the corresponding valid time window. Therefore, in this example, the UE of group #1 checks as to whether it has received a Trigger A up to 5 subframes earlier (in this case, from subframe n−5 to subframe n−1). As Trigger A has been received in subframe n−2, which is within the valid time window, the UE of group #1 will subsequently trigger an uplink transmission.

Since UE of group #2 has not received a Trigger A, Trigger B received at subframe n will not trigger an uplink transmission by UE of group #2.

As further apparent from FIG. 8, UE of group #2 receives a Trigger A at subframe n+1. In this exemplary case, the valid time window for Trigger A as sent to UE of group #2 is 3 subframes. As further shown in this figure, a second Trigger B is transmitted from the eNodeB (at subframe n+3). The second Trigger B is again received by both UEs of groups #1 and #2, although the eNodeB has transmitted the second Trigger B with the intention that same is the second-stage uplink resource scheduling message for the Trigger A (as the first-stage uplink resource scheduling message) transmitted to the UE of group #2 at subframe n+1. Upon reception of Trigger B, UE of group #2 checks as to whether it has received a Trigger A up to 3 subframes earlier (in this case, from subframe n to subframe n+2). As the corresponding Trigger A has been received in subframe n+1, which is within the valid time window, the UE of group #2 will subsequently trigger an uplink transmission.

However, since the second Trigger B is also received at UE of group #1 at subframe n+3, UE of group #1 will again check as to whether it has received a Trigger A up to 5 subframes earlier (in this case, from subframe n−2 to subframe n+2). Considering that UE of group #1 has received Trigger A at subframe n−2, that is, still within the valid time window for that received Trigger A, the UE of group #1 will again trigger its second uplink transmission, although the second triggered uplink transmission was not intended by the eNodeB to be carried out by UE of group #1, but rather only by UE of group #2. According to this exemplary scenario as shown in FIG. 8, such a second triggered uplink transmission carried out by UE of group #1 would also occur, if the second Trigger B would be received at subframe n+2 (instead of received at subframe n+3). Only, if the second Trigger B would be received at subframe n+4 or later, no multiple triggering of the uplink transmission would occur, considering the exemplary valid time window of 5 subframes for UE of group #1.

Overall, such multiple triggering of an uplink transmission is not desired in an multi-UE environment. A first reason is that such an undesired uplink transmission bears the risk of creating interference to other transmissions in the corresponding subframe. A second reason is that such multiple triggering could imply a conflict of UL transmissions: if the UE of group #1 is triggered an UL transmission by a Trigger B in subframe n, where the corresponding UL transmission was indicated by Trigger A as lasting for 4 subframes, the corresponding UL transmission exemplarily occurs in subframes n+2 to n+5. If the same UE of group #1 is again triggered an UL transmission by a Trigger B in subframe n+3, where again the corresponding UL transmission indicated by the same Trigger A should be lasting for 4 subframes, the corresponding UL transmission exemplarily occurs in subframes n+5 to n+8. As can be seen, these two triggers would therefore cause a conflict for subframe n+5, where it is not clear whether data is to be transmitted as a result of the first trigger B or as a result of the second trigger B—even though the transmission resources may be identical in both cases, the corresponding data will generally contain different transport blocks or packets. Such a conflict should be avoided because it causes potential for misunderstanding between UE and eNodeB.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following pertaining to the various implementations of the presented embodiment. It should be noted that the embodiment may be advantageously used for example in a mobile communication system, such as 3GPP LTE-A (Release 10/11/12/13 and later) communication systems as described in the Technical Background section above, but the embodiments are not limited to its use in these particular exemplary communication networks.

The explanations should not be understood as limiting the scope of the disclosure, but as a mere example of embodiments to better understand the present disclosure. A skilled person is aware that the general principles of the present disclosure as generally outlined in the set of claims and in the explanations given in the summary section of the description can be applied to different scenarios and in ways that are not explicitly described in the following. For illustration and explanation purposes, several assumptions are made which however shall not unduly restrict the scope of the following embodiments.

Furthermore, as mentioned above, the following embodiments may be implemented in the 3GPP LTE-A (Rel.12/13 and later) environment. The various embodiments mainly allow for having an improved uplink transmission scheme. Other functionality (i.e., functionality not changed by the various embodiments) however may remain exactly the same as explained in the background section or may be changed without any consequences to the various embodiments; for instance functions and procedures defining how the uplink transmission is actually performed (e.g., segmentation, modulation, coding, beamforming, multiplexing) and scheduled (PDCCH, DCI, cross carrier scheduling, self-scheduling) or how the usual uplink transmission timing by using the timing advance procedure is performed (e.g., initial timing advance, timing advance update commands).

In the following, a general embodiment is described for solving the above problem(s) in detail, which will be explained by using the following exemplary scenario, devised to easily explain the principles of the embodiment. The principles however can also be applied to other scenarios, some of which will be explicitly mentioned in the following.

A UE starts a two-stage uplink resource scheduling. In particular, the resource scheduling is initiated by a first-stage uplink resource scheduling message (Trigger A) for an unlicensed cell, which is received by a receiver of the UE. Subsequently, a second-stage uplink resource scheduling message (Trigger B) for the unlicensed cell is received by the receiver of the UE.

Subsequently, a processor of the UE determines whether the first-stage uplink resource scheduling message (Trigger A) is valid or not in a first-stage uplink resource scheduling message validation. Thereby, the determination of the validity of this first-stage uplink resource scheduling message (Trigger A) is based on a determination as to whether an uplink transmission has been triggered by another second-stage uplink resource scheduling message (Trigger B) within a predetermined time period prior to reception of the second-stage uplink resource scheduling message (Trigger B).

Subsequently, it is determined by the processor, when receiving the second-stage uplink resource scheduling message (Trigger B), that an uplink transmission is scheduled in case the processor has determined that the first-stage uplink resource scheduling message (Trigger A) is valid.

Finally, in case the processor has determined that an uplink transmission is scheduled, a transmitter of the UE performs an uplink transmission via the unlicensed cell.

This main principle of the disclosure as described above advantageously allows preventing of multiple uplink transmission triggering in a multi-UE environment. Since there is no risk for unintentionally triggering, by a Trigger B that was intended for a different UE, a second uplink transmission by that particular UE that has already previously triggered an uplink transmission within the valid time window, the eNodeB can directly transmit a new Trigger A to different UEs right after having sent a Trigger B, even within the predetermined time period/valid time window.

By this means, the user/cell throughput can be improved significantly. Moreover, avoiding a multiple uplink transmission triggering, the required Trigger A overhead can be reduced, since longer validity times as indicated by Trigger A, can be used more efficiently.

In addition, a false alarm of a second Trigger B after a correct first Trigger B within the validity time/valid time window does not cause a false PUSCH transmission. This advantageously avoids error cases due to false alarm Trigger B.

Figure 9:
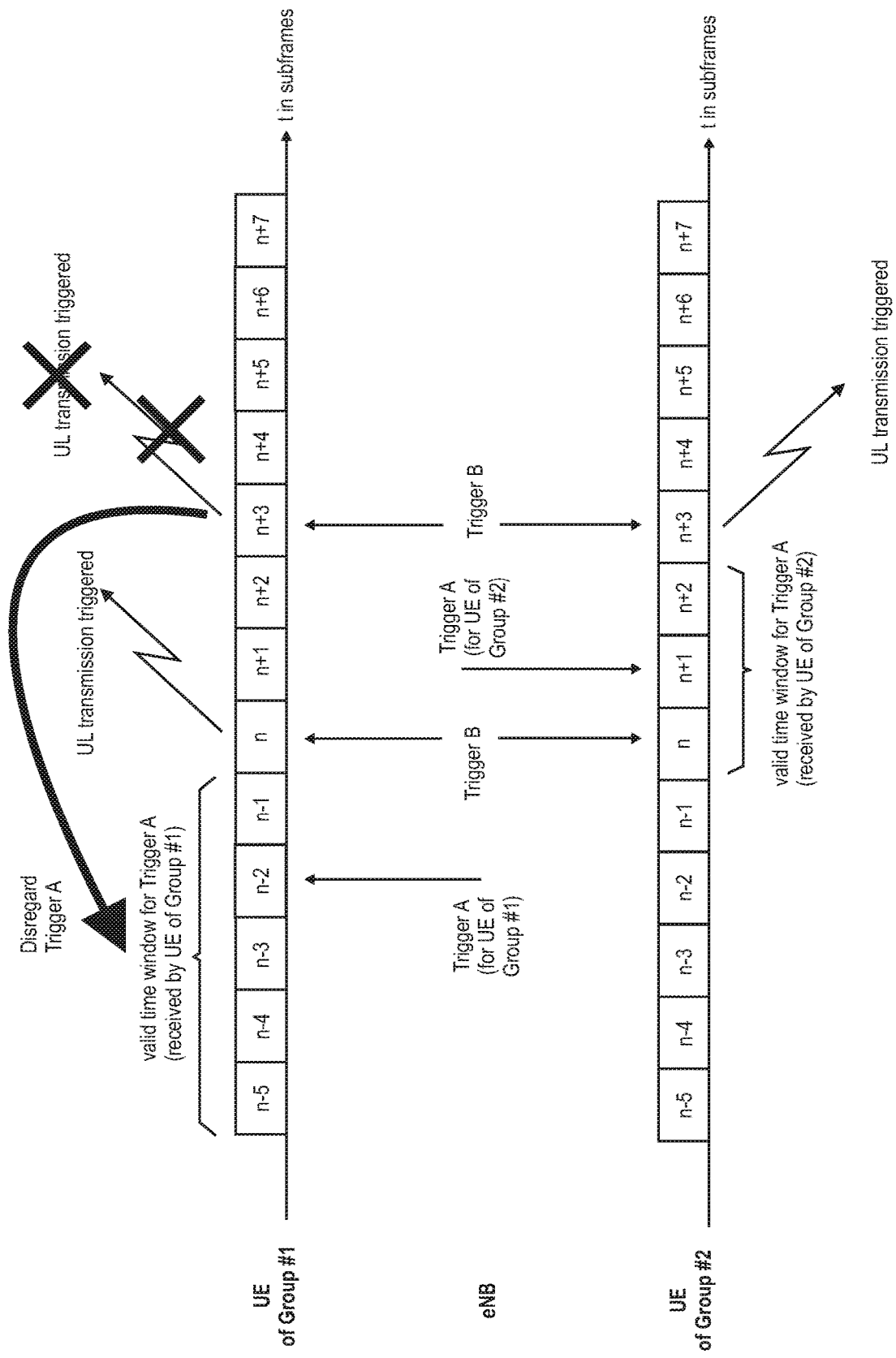
FIG. 9 illustrates prevention of multiple triggering of uplink transmissions in a multi-UEs environment according to a first implementation of an embodiment.

FIG. 9 illustrates a first implementation of the embodiment wherein multiple triggering of uplink transmissions in a multi-UEs environment is prevented.

FIG. 9 basically illustrates the situation as already described above in connection with FIG. 8 with respect to the reception of the triggers at the UEs of groups #1 and #2. As discussed, UE of group #1 receives a Trigger B at subframe n+3. In order to avoid a second triggering of an uplink transmission (which would occur in a conventional system as described in connection with FIG. 8), UE of group #1 checks as to whether another Trigger B has already triggered an uplink transmission in a predetermined time period prior to reception of the Trigger B as received at subframe n+3. Preferably the predetermined time period is the valid time window as indicated in the Trigger A message. In the example, the predetermined time period is the valid time window of a length of 5 subframes (as already explained in connection with FIG. 8, where Trigger A notifies the UE about the number of subframes (v=5) which denotes the valid time window).

Hence, UE of group #1 checks as to whether another Trigger B has triggered an uplink transmission within a time period of 5 subframes prior to subframe n+3. In particular, UE of group #1 checks as to whether another Trigger B has triggered an uplink transmission between subframe n−2 and n+2. As illustrated in FIG. 8, an uplink transmission has already been triggered by Trigger B received in subframe n. Hence, in order to avoid a multiple triggering of an uplink transmission within the valid time window for Trigger A, for any Trigger B received after the first Trigger B, which in the example is received in subframe n, the UE disregards Trigger A received at subframe n−2 which would create the valid time window between subframe n−2 and n+2 and which would enable Trigger B received at subframe n+3 to trigger another uplink transmission. In particular, disregarding Trigger A, which was received at subframe n−2, then avoids that Trigger B received at subframe n+3 would trigger an uplink transmission, since no valid time window then would be found prior to the reception of Trigger B at subframe n+3. It is to be noted that the expression "disregarding Trigger A" in case of having found a previous uplink transmission triggered within the valid time window for such Trigger A means that Trigger A received at subframe n−2 is "not considered" for Trigger B received at subframe n+3.

As a consequence, and as illustrated in FIG. 9, no undesired second/multiple uplink transmission is triggered at subframe n+3 by UE of group #1. Hence, in this case only UE of group #2 triggers an uplink transmission by the received Trigger B at subframe n+3. By means of the solution, multiple triggering in the multi-UE environment is avoided/prevented.

Figure 10:
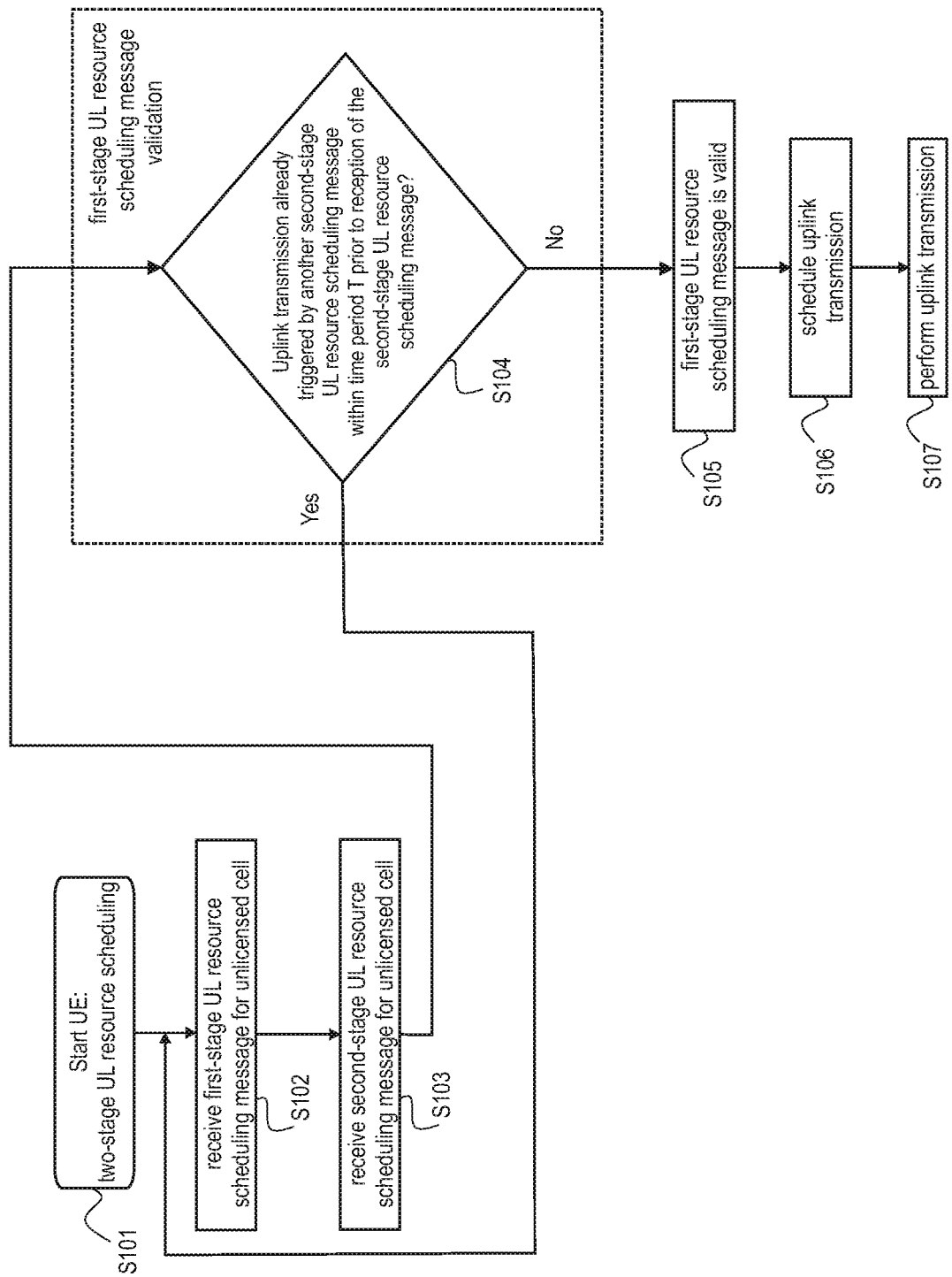
FIG. 10 is a diagram for a two-stage uplink transmission procedure according to the first implementation of the embodiment.

FIG. 10 is a diagram for a two-stage uplink transmission procedure according to the first implementation of the embodiment as already mentioned above in connection with FIG. 9.

In step S101, a UE (either one of UEs of groups #1 and #2) starts a two-stage uplink resource scheduling. In particular, the resource scheduling is initiated by a first-stage uplink resource scheduling message for an unlicensed cell, which is received by the UE in step S102. Subsequently, a second-stage uplink resource scheduling message is received by the UE for the unlicensed cell in step S103.

The first stage uplink resource scheduling message validation consists of step S104, wherein it is determined as to whether an uplink transmission has already been triggered by another second-stage uplink resource scheduling message with in time period T prior to reception of the second-stage uplink resource scheduling message. Thereby, the "time period T" corresponds to the "predetermined time period prior to reception of the second-stage uplink resource scheduling message" as reflected in the claims, as well as corresponds to the "valid time window" as shown in FIGS. 8 and 9.

If it has been determined that another uplink transmission has already been carried out within time period T ("Yes" in step S104), the process proceeds with step S102 with the next cycle of waiting for a first-stage uplink resource scheduling message.

If it is, however, determined in step S104 that no other uplink transmission has been carried out within the time period T ("No" in step S104), the process proceeds with step S105, which relates to determining that the first-stage uplink resource scheduling message is valid.

As the first-stage uplink resource scheduling message is valid, the process proceeds with step S106, which relates to scheduling uplink transmission. Subsequently, in step S107, the uplink transmission is actually performed.

Figure 11:
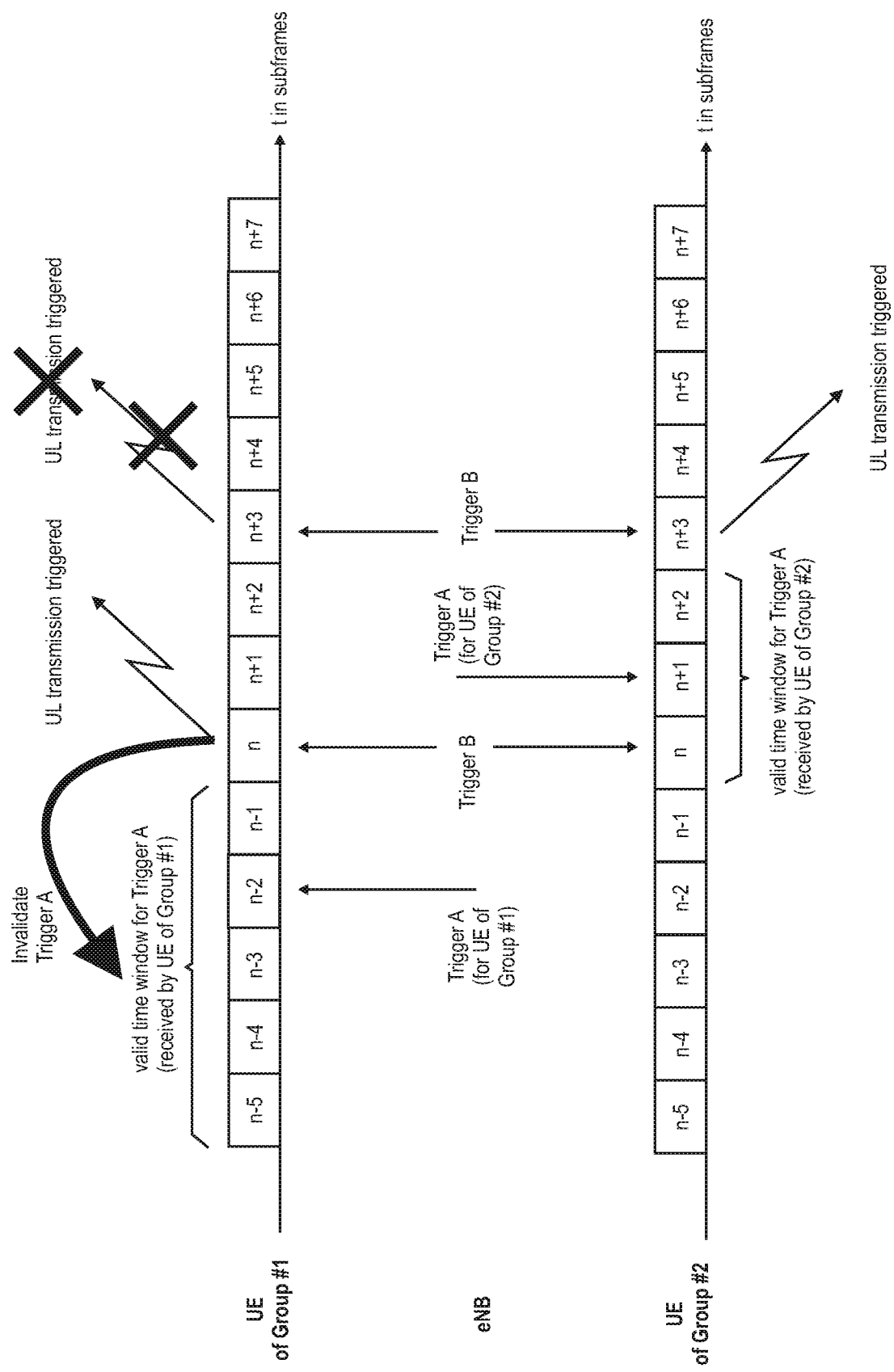
FIG. 11 illustrates prevention of multiple triggering of uplink transmissions in a multi-UEs environment according to a second implementation of the embodiment.

FIG. 11 illustrates a second implementation of the embodiment wherein multiple triggering of uplink transmissions in a multi-UEs environment is prevented. The second implementation is an alternative to the first implementation, wherein, however, a multiple triggering of an uplink transmission by the same UE within the valid time window for Trigger A is avoided by invalidating Trigger A instead of merely disregarding Trigger A as described in the first implementation.

Reference is made to the scenario of FIG. 9, wherein the second Trigger B has been received by UE of group #1 at subframe n+3. As an alternative to the first implementation of the embodiment, in the second implementation of the embodiment according to FIG. 11, UE of group #1 can actively invalidate Trigger A (which has been received at subframe n−2), upon receiving Trigger B at subframe n (invalidation can also be performed at subframe n+1 or n+2, but needs to be performed before interpreting/analyzing/considering the second Trigger B at subframe n+3). Hence, the second Trigger B as received at subframe n+3 is not able to trigger an uplink transmission at the UE of group #1, since there is no valid time window for Trigger A anymore. In other words, the second implementation of the embodiment actively disables/invalidates Trigger A upon the reception of the first Trigger B (or at least prior to the reception of the next Trigger B), which has already triggered an uplink transmission. Hence, by actively invalidating/disabling Trigger A, thereby removing a valid time window for Trigger A, no unintended multiple uplink transmission can be triggered by UE of group #1.

Overall, it is to be noted that the second implementation of the embodiment (according to FIG. 11) generally differs from the first implementation (according to FIGS. 9 and 10) by invalidating Trigger A (removing the valid time window for Trigger A) upon an uplink transmission having been triggered by the Trigger B, instead of merely disregarding Trigger A (disregarding the valid time window for Trigger A) upon reception of a second Trigger B, as shown in FIG. 9.

Actively "invalidating/disabling Trigger A" may, for instance, be implemented by toggling a specific bit in a field that is associated with invalidating/disabling of the first stage uplink transmission resource scheduling message Trigger A.

Figure 12:
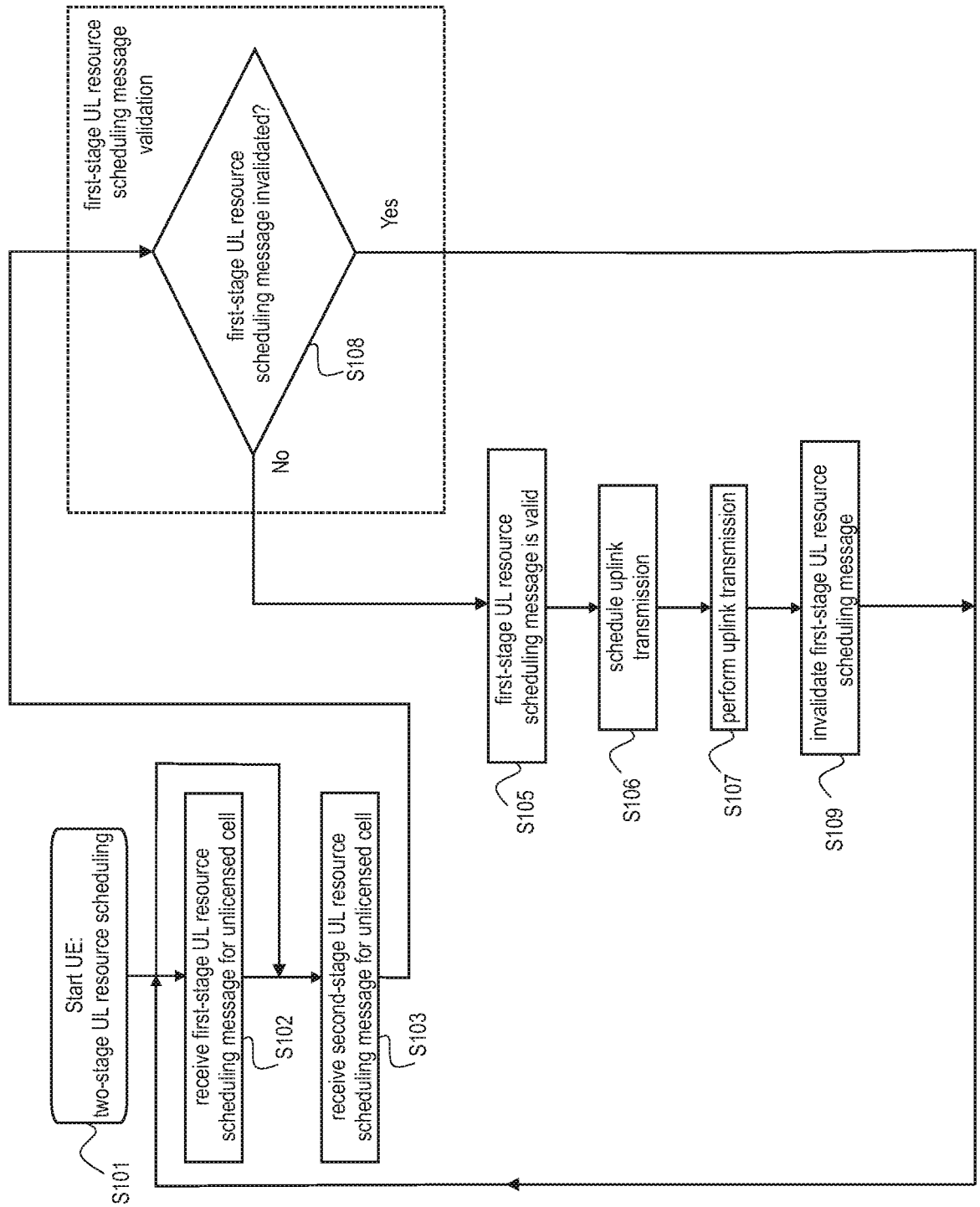
FIG. 12 is a diagram for a two-stage uplink transmission procedure according to the second implementation of the embodiment.

FIG. 12 is a diagram for a two-stage uplink transmission procedure according to the second implementation of the embodiment as already mentioned above in connection with FIG. 11.

In step S101, a UE (either one of UEs of groups #1 and #2) starts a two-stage uplink resource scheduling. In particular, the resource scheduling is initiated by a first-stage uplink resource scheduling message for an unlicensed cell, which is received by the UE in step S102. Subsequently, a second-stage uplink resource scheduling message is received by the UE for the unlicensed cell in step S103.

The first stage uplink resource scheduling message validation consists of step S108, wherein it is determined as to whether the first-stage uplink resource scheduling message has been invalidated. If it is determined that the first-stage uplink resource scheduling message has been invalidated ("Yes" in step S108), the process proceeds with step S102 with the next cycle of waiting for a first-stage uplink resource scheduling message or to step S103 waiting for a second-stage uplink resource scheduling message.

If it is determined in step S108 that the first-stage uplink resource scheduling message has not been invalidated ("No" in step S108), the process proceeds with step S105, which relates to determining that the first-stage uplink resource scheduling message is valid. Subsequently, as the first-stage uplink resource scheduling message is valid, the process proceeds with step S106, which relates to scheduling uplink transmission. Subsequently, in step S107, the uplink transmission is actually performed. Thereafter, the process proceeds with step S109, which relates to invalidating the first-stage uplink resource scheduling message. Subsequently, the process proceeds with step S102 with the next cycle of waiting for a first-stage uplink resource scheduling message or to step S103 waiting for a second-stage uplink resource scheduling message.

Should, for instance, a second-stage uplink resource scheduling message be received after the invalidation of the first-stage uplink resource scheduling message (in step S109), the process proceeds from step S103 to step S108. At step S108, it is determined that the first-stage uplink resource scheduling message is invalid so that the process again proceeds to step S102 or step S103, without performing an uplink transmission.

This procedure as described above reflects the specific behavior as illustrated in FIG. 11, where the second Trigger B at subframe n+3 does not initiate a further uplink transmission, since Trigger A has already been invalidated upon the first Trigger B has triggered the uplink transmission.

In the foregoing description of the embodiment, a two-stage uplink radio resource scheduling is described for a cell of a communication system. It is to be noted that such the two-stage uplink radio resource scheduling is not only possible for unlicensed or licensed cells, but also for any cells that support a two-stage uplink radio resource scheduling.

According to a further embodiment, which is implemented in the environment of Standard TS 36.213, clause 8.0, is proposed to specify in the standard:

For a serving cell that is a LAA SCell, a UE shall
upon detection of an PDCCH/EPDCCH with DCI format 0A/0B/4A/4B and with 'PUSCH trigger A' field set to '0' in subframe n intended for the UE, or
upon detection of PDCCH/EPDCCH with DCI format 0A/0B/4A/4B and with 'PUSCH trigger A' field set to '1' in the most recent subframe from subframe n−v intended for the UE that has not been triggered by a 'PUSCH trigger B' field set to '1' within subframe n−v+1 and subframe n−1, and upon detection of PDCCH with DCI CRC scrambled by CC-RNTI and with 'PUSCH trigger B' field set to '1' in subframe n
perform a corresponding PUSCH transmission, conditioned on the channel access procedures described in clause 15.2.1, in subframe(s) n+1+k+i with i=0, 1, . . . , N−1 according to the PDCCH/EPDCCH and [ . . . ]

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A radio base station, comprising:
   a transmitter, which, in operation, transmits to a user equipment a first-stage uplink resource scheduling message indicating uplink radio resources usable by the user equipment to perform an uplink transmission via an unlicensed cell, and a second-stage uplink resource scheduling message related to the first-stage uplink resource scheduling message,
   wherein the first-stage uplink resource scheduling message is valid or not depending on whether the uplink transmission from the user equipment has been triggered or not by another second-stage uplink resource scheduling message within a predetermined time period prior to reception of the second-stage uplink resource scheduling message at the user equipment, and
   a receiver, which, in operation, receives the uplink transmission from the user equipment via the unlicensed cell.

2. The radio base station according to claim 1, wherein the first-stage uplink resource scheduling message is valid when no uplink transmission has been triggered by the other second-stage uplink resource scheduling message in the predetermined time period prior to reception of the second-stage uplink resource scheduling message at the user equipment.

3. The radio base station according to claim 1, wherein the first-stage uplink resource scheduling message is invalid when the uplink transmission has been triggered by the other second-stage uplink resource scheduling message in the predetermined time period prior to reception of the second-stage uplink resource scheduling message, and
   wherein the first-stage uplink resource scheduling message is valid when the first-stage uplink resource scheduling message has not been invalidated.

4. The radio base station according to claim 1, wherein the first-stage uplink resource scheduling message is addressed to the user equipment, and the second-stage uplink resource scheduling message is commonly addressed to a plurality of user equipments including the user equipment.

5. The radio base station according to claim 1, wherein the first-stage uplink resource scheduling message is addressed to the user equipment by means of a user-equipment-specific identity employed in the transmission of the first-stage uplink resource scheduling message.

6. The radio base station according to claim 5, wherein the user-equipment-specific identify is configurable.

7. The radio base station according to claim 1, wherein the second-stage uplink resource scheduling message is commonly addressed to a plurality of user equipments including the user equipment, by means of a shared identity employed in the transmission of the second-stage uplink resource scheduling message.

8. The radio base station according to claim 7, wherein the shared identify is pre-configured.

9. The radio base station according to claim 1, wherein the first-stage uplink resource scheduling message indicates the predetermined time period.

10. The radio base station according to claim 1, wherein, during the predetermined time period, the first-stage uplink resource scheduling message is processed together with the second-stage uplink resource scheduling message at the user equipment.

11. The radio base station according to claim 1, wherein the first-stage uplink resource scheduling message is processed together with the second-stage uplink resource scheduling message at the user equipment in case the second-stage uplink resource scheduling message is received within the predetermined time period after reception of the first-stage uplink resource scheduling message at the user equipment.

12. The radio base station according to claim 1, wherein the first-stage uplink resource scheduling message indicates a first time offset to be considered for the uplink transmission.

13. The radio base station according to claim 12, wherein the second-stage uplink resource scheduling message indicates a second time offset to be considered for the uplink transmission.

14. The radio base station according to claim 13, wherein the receiver, in operation, receives the uplink transmission at least after a sum of the first time offset and the second time offset after reception of the second-stage uplink resource scheduling message at the user equipment.

15. The radio base station according to claim 1, wherein the first-stage uplink resource scheduling message is a downlink control information (DCI) message of format 0A, 0B, 4A, or 4B, respectively comprising a first-stage flag indicating that the DCI message is a first uplink resource scheduling message of a two-stages uplink resource scheduling.

16. The radio base station according to claim 1, wherein the second-stage uplink resource scheduling message is a downlink control information (DCI) message of format 1C, comprising a second-stage flag indicating that the DCI message is a second uplink resource scheduling message of a two-stages uplink resource scheduling.

17. A method implemented in a radio base station, the method comprising:
   transmitting to a user equipment a first-stage uplink resource scheduling message indicating uplink radio resources usable by the user equipment to perform an uplink transmission via an unlicensed cell,
   transmitting to the user equipment a second-stage uplink resource scheduling message, which is related to the first-stage uplink resource scheduling message,
   wherein the first-stage uplink resource scheduling message is valid or not depending on whether the uplink transmission from the user equipment has been triggered or not by another second-stage uplink resource scheduling message within a predetermined time period prior to reception of the second-stage uplink resource scheduling message at the user equipment, and
   receiving the uplink transmission from the user equipment via the unlicensed cell.

18. The method according to claim 17, wherein the first-stage uplink resource scheduling message is valid when no uplink transmission has been triggered by the other second-stage uplink resource scheduling message in the predetermined time period prior to reception of the second-stage uplink resource scheduling message at the user equipment.

19. The method according to claim 17, wherein the first-stage uplink resource scheduling message is invalid when the uplink transmission has been triggered by the other second-stage uplink resource scheduling message in the predetermined time period prior to reception of the second-stage uplink resource scheduling message.

20. The method according to claim 17, wherein the first-stage uplink resource scheduling message indicates the predetermined time period.

* * * * *